Patented July 25, 1950

2,516,321

UNITED STATES PATENT OFFICE 2,516,321

DRY, STABILIZED SODIUM DITHIONITE COMPOSITION

Loren C. Hurd, Jenkintown, and Gerard C. Riley, Philadelphia, Pa., assignors to Rohm & Haas Company, Philadelphia, Pa., a corporation of Delaware No Drawing. Application September 10, 1948, Serial No. 48,758

2 Claims. (Cl. 252—188)

This invention relates to dry reducing compositions which are stable during storage and which are readily soluble in water to give relatively stable solutions serving as reducing or stripping baths for many types of dyed fabrics.

Hydrosulfites have been known for some time as powerful reducing agents which are useful for the preparation of dye baths on the one hand and for the stripping or removal of dyes from fabrics on the other. Such uses suggested the application of the hydrosulfites for use as household strippers. Packaging and marketing of hydrosulfites soon brought out a number of serious objections thereto and attempts were soon made to so modify them that they might be used without the expert knowledge or careful control which is available in industrial applications. Sodium hydrosulfite, while stable in a dry state in sealed containers, decomposes in solution unless rendered distinctly alkaline and is usually used at relatively low temperatures. The sulfoxylate-formaldehyde derivative is decomposed by warm, moist air and for effective use is used at elevated temperatures on the acid side. Neither type of material, even with proposed modifications, has thus far, however, proved entirely acceptable for a packaged product for use on a small scale under the conditions encountered in the home and for the diverse applications there to be met.

A dry composition has now been discovered which overcomes the difficulties in the use of hydrosulfites as packaged strippers and overcomes the objections to the modifications heretofore proposed. It has been found that a mixture of 80 to 94 parts of sodium hydrosulfite, 3 to 10 parts of sodium tetraborate, and 3 to 10 parts of paraformaldehyde provides a stable composition which may be packaged, stored for extended periods of time, and used under practically all conditions encountered in household applications. The composition is also of value in many industrial applications. The solutions thereof are sufficiently stable even at the boil to remain effective while a reducible dye is solubilized. The solutions act with marked uniformity. Since the action is gradual and gentle, stripping is even, streaks and blotches are absent, and the stripped fabric is not attacked. During the stripping there are no gases evolved and no noxious odors developed.

There were mixed 90 parts by weight of powdered sodium hydrosulfite which assayed 95% pure, 5 parts of sodium tetraborate, and 5 parts of paraformaldehyde. The mixture was tumbled to ensure thorough mixing and then packaged in sealed paper cartons. Samples were taken from the cartons from time to time and the length of time noted for a 5% loss in reducing power to occur. As controls, there were also packaged preparations containing (a) 95 parts of sodium hydrosulfite and 5 parts of sodium tetraborate, (b) 95 parts of sodium hydrosulfite and 5 parts of paraformaldehyde, (c) 90 parts of sodium hydrosulfite and 10 parts of sodium carbonate, and (d) 90 parts of sodium hydrosulfite and 10 parts of sodium bicarbonate. The preparations marked (c) and (d) had an objectionable tendency to form a cake and began to lose reducing power within four days. Preparation (b) showed a 5% loss within 20 days, while preparation (a) showed such loss within five days. The mixture containing both sodium tetraborate and formaldehyde was intact after two months of storage.

There was mixed a composition from 85 parts of sodium hydrosulfite, 10 parts of sodium tetraborate, and 5 parts of paraformaldehyde. This composition was satisfactory on storage. It did not cake, develop odors, or lose rapidly in reducing power. The same advantages were observed for a mixture of 85 parts of sodium hydrosulfite, 5 parts of sodium tetraborate, and 10 parts of paraformaldehyde. It was further found that at least three parts of sodium tetraborate and of paraformaldehyde each must be present to provide the minimum protective or stabilizing action needed for average conditions of storage and use. More than ten parts of each are generally unnecessary, while larger amounts of such materials decrease the reducing capacity of the preparations to an objectionable extent.

Tests for efficiency of stripping were made with typical preparations. Two liters of water were heated to the boiling point. Thereto was added a piece of cotton fabric dyed with Chloramine Fast Scarlet 2BSW, direct dye C1326. Twenty grams of the stripping composition was then slowly added. Heating was continued for three minutes. The fabric was then removed from the bath, rinsed in cold water, and dried. When a mixture of 95% of sodium hydrosulfite and 5% of sodium carbonate or 5% of sodium tetraborate was used, there was a marked evolution of sulfur dioxide. A mixture of 95% of sodium hydrosulfite and 5% of paraformaldehyde also permitted an objectionable amount of sulfur dioxide to be evolved. The same was also true of a sample of pure sodium hydrosulfite. Yet the mixture of 90% of sodium hydrosulfite, 5% of sodium tetraborate, and 5% of paraformaldehyde gave at most a slight odor which was considered unobjectionable. Stripping with this preparation was entirely satisfactory.

The mixtures of sodium hydrosulfite in major proportion with lesser proportions of sodium tetraborate and paraformaldehyde were found to be widely useful for stripping without expert control or special precautions. The mixtures are readily soluble in water and in dye solutions and no precipitate is thrown out of the stripping baths. During the use of the mixture no offensive odors, gas, or spray is evolved. No offensive odors were developed in the dry packaged composition during storage. The composition was found to retain a high degree of activity in closed packages for extended periods of time without caking or lumping. These are all advantages which accrue from the particular combination shown.

While the name "sodium hydrosulfite" has been commonly used in the past in commerce, the product identified by this name is more properly called "sodium dithionite" and is now so indexed in scientific literature. Accordingly, this term will be used in claiming the compositions herein described.

We claim:
1. A dry, reducing composition consisting essentially of a mixture of 3 to 10 parts of sodium tetraborate, 3 to 10 parts of paraformaldehyde, and 80 to 94 parts of sodium dithionite, the parts being by weight.
2. A dry, reducing composition consisting essentially of a mixture of 5 parts of sodium tetraborate, 5 parts of paraformaldehyde, and 90 parts of sodium dithionite, the parts being by weight.

LOREN C. HURD.
GERARD C. RILEY.

REFERENCES CITED

The following references are of record in the file of this patent:

UNITED STATES PATENTS

| Number | Name | Date |
|---|---|---|
| 346,461 | Broadbent | Aug. 3, 1886 |
| 1,170,624 | Fuller | Feb. 8, 1916 |
| 1,918,873 | Scribner | July 18, 1933 |